United States Patent
Henry et al.

(10) Patent No.: US 7,065,455 B2
(45) Date of Patent: Jun. 20, 2006

(54) CORRECTING FREQUENCY IN FLOWTUBE MEASUREMENTS

(75) Inventors: Manus P. Henry, Oxford (GB); Mayela E. Zamora, Oxford (GB)

(73) Assignee: Invensys Systems, Inc., Foxboro, MA (US)

(*) Notice: Subject to any disclaimer, the term of this patent is extended or adjusted under 35 U.S.C. 154(b) by 0 days.

(21) Appl. No.: 10/902,146

(22) Filed: Jul. 30, 2004

(65) Prior Publication Data
US 2005/0034537 A1    Feb. 17, 2005

Related U.S. Application Data

(60) Provisional application No. 60/494,556, filed on Aug. 13, 2003.

(51) Int. Cl.
*G01F 17/00*    (2006.01)
*G01F 23/00*    (2006.01)
*G01L 7/00*    (2006.01)
*G01N 11/00*    (2006.01)

(52) U.S. Cl. ........................................ 702/56
(58) Field of Classification Search ........... 702/45, 702/50, 54, 56; 73/861.355, 861.22; 417/26
See application file for complete search history.

(56) References Cited

U.S. PATENT DOCUMENTS

| | | |
|---|---|---|
| 3,956,682 A | 5/1976 | Van Dyck |
| RE29,383 E | 9/1977 | Gallatin et al. |
| 4,358,822 A | 11/1982 | Sanchez |
| RE31,450 E | 11/1983 | Smith |
| 4,419,898 A | 12/1983 | Zanker et al. |
| 4,422,338 A | 12/1983 | Smith |
| 4,491,025 A | 1/1985 | Smith et al. |
| 4,688,418 A | 8/1987 | Cheung et al. |
| 4,727,746 A | 3/1988 | Mikasa et al. |
| 4,757,390 A | 7/1988 | Mehrgardt et al. |
| 4,773,257 A | 9/1988 | Aslesen et al. |
| 4,782,711 A | 11/1988 | Pratt |
| 4,801,897 A | 1/1989 | Flecken |
| 4,817,448 A | 4/1989 | Hargarten et al. |
| 4,823,614 A | 4/1989 | Dahlin |
| 4,852,395 A | 8/1989 | Kolpak |

(Continued)

FOREIGN PATENT DOCUMENTS

EP    0 702 212    3/1996

(Continued)

OTHER PUBLICATIONS

J. Hemp et al.; "On the Theory and Performance of Coriolis Mass Flowmeters"; Proceedings of the International Conference on Mass Flow Measurement Direct and Indirect; IBC Technical Services; 40 pages; London, Feb. 1989.

(Continued)

*Primary Examiner*—John Barlow
*Assistant Examiner*—Aditya Bhat
(74) *Attorney, Agent, or Firm*—Fish & Richardson P.C.

(57) ABSTRACT

Techniques are described for accurately measuring a density or other parameter of a fluid traveling through a vibratable conduit, using a flowmeter. The techniques involve obtaining measurements of a frequency of vibration of the conduit, as a function of a phase difference between two sensors measuring the vibration. Using the measurements, a corrected frequency corresponding to a zero phase difference can be estimated, and this corrected frequency can be used to perform density calculations. These techniques remove an undesirable dependency between the frequency/phase difference variables.

17 Claims, 10 Drawing Sheets

U.S. PATENT DOCUMENTS

| | | |
|---|---|---|
| 4,852,410 A | 8/1989 | Corwon et al. |
| 4,879,911 A | 11/1989 | Zolock |
| 4,891,991 A | 1/1990 | Mattar et al. |
| 4,895,030 A | 1/1990 | Bergamini et al. |
| 4,911,006 A | 3/1990 | Hargarten et al. |
| 4,911,020 A | 3/1990 | Thompson |
| 4,934,195 A | 6/1990 | Hussain |
| 4,934,196 A | 6/1990 | Romano |
| 4,996,871 A | 3/1991 | Romano |
| 5,027,662 A | 7/1991 | Titlow et al. |
| 5,029,482 A | 7/1991 | Liu et al. |
| 5,050,439 A | 9/1991 | Thompson |
| 5,052,231 A | 10/1991 | Christ et al. |
| 5,054,313 A | 10/1991 | Fitzgerald et al. |
| 5,054,326 A | 10/1991 | Mattar |
| 5,218,869 A | 6/1993 | Pummer |
| 5,228,327 A | 7/1993 | Bruck |
| 5,259,250 A | 11/1993 | Kolpak |
| 5,271,281 A | 12/1993 | Mattar et al. |
| 5,295,084 A | 3/1994 | Arunachalam et al. |
| 5,301,557 A | 4/1994 | Cage et al. |
| 5,343,764 A | 9/1994 | Mattar et al. |
| 5,347,874 A | 9/1994 | Kalotay et al. |
| 5,400,653 A | 3/1995 | Kalotay |
| 5,429,002 A | 7/1995 | Coleman |
| 5,469,748 A | 11/1995 | Kalotay |
| 5,497,665 A | 3/1996 | Cage et al. |
| 5,497,666 A | 3/1996 | Patten et al. |
| 5,535,632 A | 7/1996 | Kolpak |
| 5,555,190 A | 9/1996 | Derby et al. |
| 5,570,300 A | 10/1996 | Henry et al. |
| 5,578,764 A | 11/1996 | Yokoi et al. |
| 5,594,180 A | 1/1997 | Carpenter et al. |
| 5,648,616 A | 7/1997 | Keel |
| 5,654,502 A | 8/1997 | Dutton |
| 5,687,100 A | 11/1997 | Buttler et al. |
| 5,732,193 A | 3/1998 | Aberson |
| 5,734,112 A | 3/1998 | Bose et al. |
| 5,767,665 A * | 6/1998 | Morita et al. ............ 324/76.52 |
| 5,774,378 A | 6/1998 | Yang |
| 5,804,741 A | 9/1998 | Freeman |
| 5,877,954 A | 3/1999 | Kimasauskas et al. |
| 5,926,096 A | 7/1999 | Mattar et al. |
| 5,969,264 A | 10/1999 | Rivkin |
| 6,073,495 A | 6/2000 | Stadler |
| 6,092,429 A | 7/2000 | Cunningham et al. |
| 6,185,470 B1 | 2/2001 | Pado et al. |
| 6,301,973 B1 | 10/2001 | Smith |
| 6,309,342 B1 | 10/2001 | Blazey et al. |
| 6,311,136 B1 | 10/2001 | Henry et al. |
| 6,318,156 B1 | 11/2001 | Dutton et al. |
| 6,318,186 B1 | 11/2001 | Smith et al. |
| 6,327,914 B1 | 12/2001 | Dutton |
| 6,360,175 B1 * | 3/2002 | Cunningham et al. ........ 702/56 |
| 6,505,131 B1 | 1/2003 | Henrot |
| 6,505,519 B1 | 1/2003 | Henry et al. |
| 6,507,791 B1 | 1/2003 | Henry et al. |
| 6,551,251 B1 | 4/2003 | Zuckerwar et al. |
| 6,564,619 B1 | 5/2003 | Dutton et al. |
| 6,606,573 B1 * | 8/2003 | Wheeler ...................... 702/56 |
| 6,782,762 B1 * | 8/2004 | Cage ..................... 73/861.355 |
| 2002/0033043 A1 | 3/2002 | Dutton et al. |
| 2002/0038186 A1 | 3/2002 | Henry et al. |
| 2002/0133307 A1 | 9/2002 | Maginnis |

FOREIGN PATENT DOCUMENTS

| | | |
|---|---|---|
| WO | WO 02/08703 | 1/2002 |

OTHER PUBLICATIONS

Spitzer, David A., "Mass Flowmeters," Industries Flow Measurement, Chapter 12, pp. 197-210, 1990.

Wood, et al., "A Phase-Locked Loop for Driving Vibrating Tube Densimeters," *Rev. Sci. Instrum.*, vol. 60, No. 3, Mar. 1989, pp. 493-494.

* cited by examiner

CORRECTING FREQUENCY IN FLOWTUBE MEASUREMENTS

CROSS-REFERENCE TO RELATED APPLICATIONS

This application claims priority to U.S. Provisional Application No. 60/494,556, filed on Aug. 13, 2003, and titled CORRECTING FREQUENCY IN FLOWTUBE MEASUREMENTS, which is incorporated by reference in its entirety.

TECHNICAL FIELD

This description relates to flowmeters.

BACKGROUND

Flowmeters provide information about materials being transferred through a conduit. For example, mass flowmeters provide a measurement of the mass of material being transferred through a conduit. Similarly, density flowmeters, or densitometers, provide a measurement of the density of material flowing through a conduit. Mass flowmeters also may provide a measurement of the density of the material.

For example, Coriolis-type mass flowmeters are based on the Coriolis effect, in which material flowing through a rotating conduit is affected by a Coriolis force and therefore experiences an acceleration. Many Coriolis-type mass flowmeters induce a Coriolis force by sinusoidally oscillating a conduit about a pivot axis orthogonal to the length of the conduit. In such mass flowmeters, the Coriolis reaction force experienced by the traveling fluid mass is transferred to the conduit itself and is manifested as a deflection or offset of the conduit in the direction of the Coriolis force vector in the plane of rotation.

SUMMARY

According to one general aspect, a flowmeter includes a vibratable flowtube, a driver connected to the flowtube and operable to impart motion to the flowtube, a first sensor connected to a first portion of the flowtube and operable to sense a frequency of the motion of the flowtube and generate a first sensor signal, a second sensor connected to a second portion of the flowtube and operable to sense the frequency of the motion of the flowtube and generate a second sensor signal, and a controller operable to adjust the frequency sensed by the sensors based on a phase difference between the first sensor signal and the second sensor signal, to thereby obtain a corrected frequency.

Implementations may include one or more of the following features. For example, the controller may be operable to determine a density or mass flow rate of a material flowing through the flowtube, based on the corrected frequency.

The controller may be operable to determine a relationship between the frequency and the phase difference, based on a plurality of frequency measurements and corresponding phase difference measurements. The controller may be operable to adjust the frequency based on the relationship, and the corrected frequency corresponds to a phase difference of zero. In this case, the relationship may be determined based on a linear regression or quadratic fit based on the frequency measurements and phase difference measurements.

The controller may be operable to store the corrected frequency in conjunction with an operational parameter of the flowmeter, where the operational parameter includes at least one of: a size of the vibratable flowtube, an orientation of the vibratable flowtube, a substance flowing through the vibratable flowtube, a type of the vibratable flowtube, and a temperature of the vibratable flowtube. In this case, the controller may be operable to output the corrected frequency based on an input of one of the operational parameter.

The first sensor may be positioned on a first side of the vibratable flowtube, and the second sensor may be positioned on a second side of the vibratable flowtube.

According to another general aspect, an operational parameter associated with an operation of a flowmeter is determined. A corrected frequency corresponding to the operational parameter is selected, where the corrected frequency is determined based on a phase difference between a first sensor signal and a second sensor signal, and the first sensor signal and the second signal correspond to a frequency of vibration of a flowtube associated with the flowmeter. A flow parameter of a material flowing through the flowtube is determined, based on the corrected frequency.

Implementations may include one or more of the following features. For example, in determining the flow parameter, a density or mass flow rate of the material may be determined. The operational parameter may be received from a user of the flowmeter, and may include at least one of: a size of the flowtube, an orientation of the flowtube, the material flowing through the flowtube, a type of the flowtube, and a temperature of the flowtube.

In selecting the corrected frequency corresponding to the operational parameter, the corrected frequency, which may correspond to a phase difference of zero, may be accessed from a memory in which the corrected frequency is stored in conjunction with the operational parameter. The corrected frequency may be determined by determining a relationship between a plurality of measured frequency values and a plurality of measured phase differences.

According to another general aspect, a flowmeter controller includes a measurement system operable to receive a first sensor signal and a second sensor signal and determine a frequency of vibration of a flowtube having a material flowing therethrough, based on the first sensor signal and the second sensor signal, a frequency correction system operable to determine a corrected frequency of the flowtube corresponding to a zero phase difference between the first sensor signal and the second sensor signal, and a flow parameter determination system operable to determine a flow parameter characterizing the material, based on the corrected frequency.

Implementations may include one or more of the following features. For example, the measurement system may be operable to measure a phase difference between the first sensor signal and the second sensor signal.

The frequency correction system may be operable to determine the corrected frequency by establishing a relationship between a plurality of frequency measurements and a plurality of phase difference measurements output by the measurement system. In this case, the frequency correction system may be operable to determine the zero phase difference based on the relationship.

The details of one or more implementations are set forth in the accompanying drawings and the description below. Other features will be apparent from the description and drawings, and from the claims.

DESCRIPTION

Techniques are described for performing correction of frequency measurements to account for effects of a phase difference that may exist between two sides of a vibrating flowtube. Such a correction may be useful, for example, when measuring a mass flow rate or density of a material traveling through the flowtube. Such a correction may be used to reduce the effect of the phase difference on frequency and/or related measurements to, for example, less than 0.5%.

Types of flowmeters include digital flowmeters. For example, U.S. Pat. No. 6,311,136, which is hereby incorporated by reference, discloses the use of a digital flowmeter and related technology. Such digital flowmeters may be very precise in their measurements, with little or negligible noise, and may be capable of enabling a wide range of positive and negative gains at the driver circuitry for driving the conduit. Such digital flowmeters are thus advantageous in a variety of settings. For example, commonly-assigned U.S. Pat. No. 6,505,519, which is hereby incorporated by reference, discloses the use of a wide gain range, and/or the use of negative gain, to prevent stalling and to more accurately exercise control of the flowtube, even during difficult conditions such as two-phase flow.

Although digital flowmeters are specifically discussed below with respect to FIGS. 1 and 2, it should be understood that analog flowmeters also exist. Although such analog flowmeters may be prone to typical shortcomings of analog circuitry, e.g., low precision and high noise measurements relative to digital flowmeters, they also may be compatible with the various techniques and implementations discussed herein. Thus, in the following discussion, the term "flowmeter" or "meter" is used to refer to any type of device and/or system in which various control systems and related elements interact with a flowtube or other conduit to measure a mass flow, density, and/or other parameters of a material(s) moving through the flowtube/conduit.

Figure 1A:
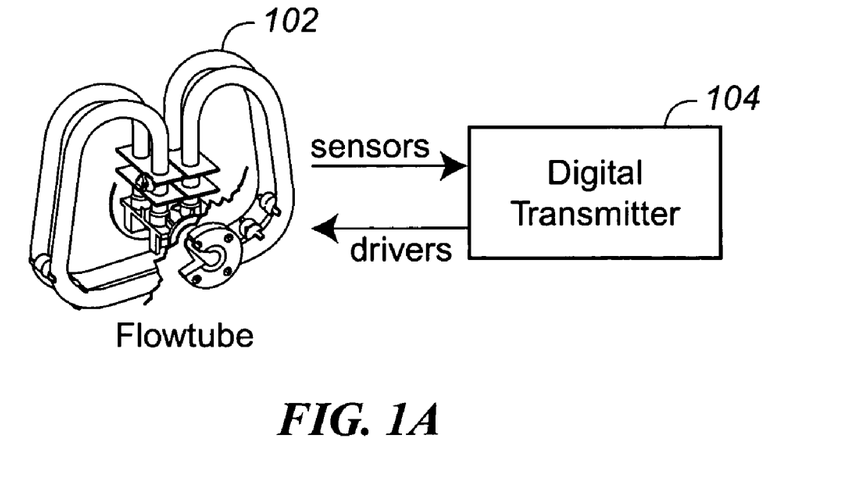
FIG. 1A is an illustration of a Coriolis flowmeter using a bent flowtube.

FIG. 1A is an illustration of a digital flowmeter using a bent flowtube 102. Specifically, the bent flowtube 102 may be used to measure one or more physical characteristics of, for example, a (traveling) fluid, as referred to above. A detailed description of a structure and operation(s) of the bent flowtube 102 is provided in, for example, commonly-assigned U.S. Pat. No. 6,311,136.

In FIG. 1A, a digital transmitter 104 exchanges sensor and drive signals with the bent flowtube 102, so as to both sense an oscillation of the bent flowtube 102, and to drive the oscillation of the bent flowtube 102 accordingly. By quickly and accurately determining the sensor and drive signals, the digital transmitter 104, as referred to above, provides for fast and accurate operation of the bent flowtube 102.

Figure 1B:
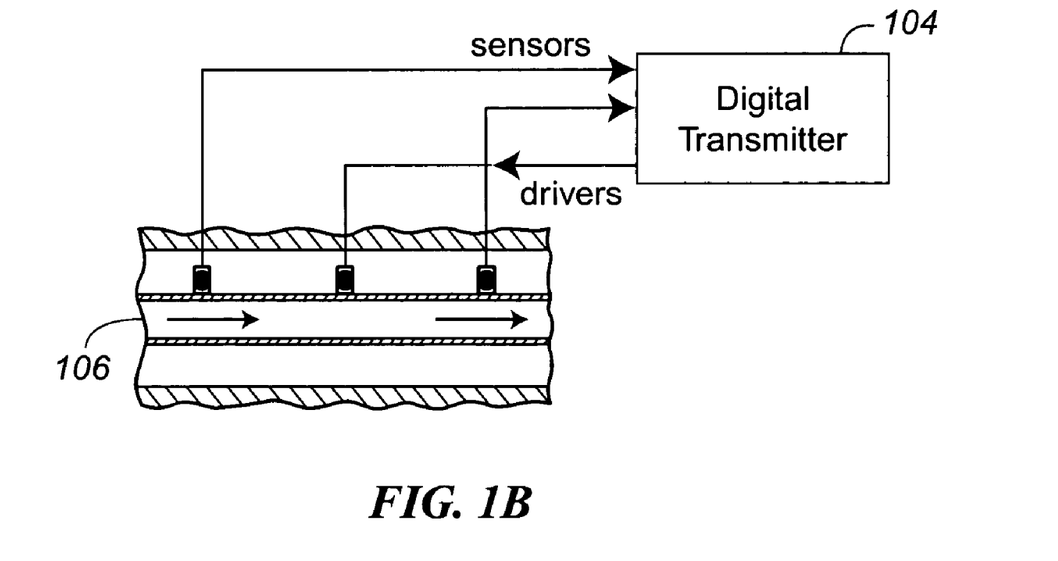
FIG. 1B is an illustration of a Coriolis flowmeter using a straight flowtube.

FIG. 1B is an illustration of a digital flowmeter using a straight flowtube 106. More specifically, in FIG. 1B, the straight flowtube 106 interacts with the digital transmitter 104. Such a straight flowtube operates similarly to the bent flowtube 102 on a conceptual level, and has various advantages/disadvantages relative to the bent flowtube 102. For example, the straight flowtube 106 may be easier to (completely) fill and empty than the bent flowtube 102, simply due to the geometry of its construction. In operation, the bent flowtube 102 may operate at a frequency of, for example, 50–110 Hz, while the straight flowtube 106 may operate at a frequency of, for example, 300–1,000 Hz.

Figure 2:
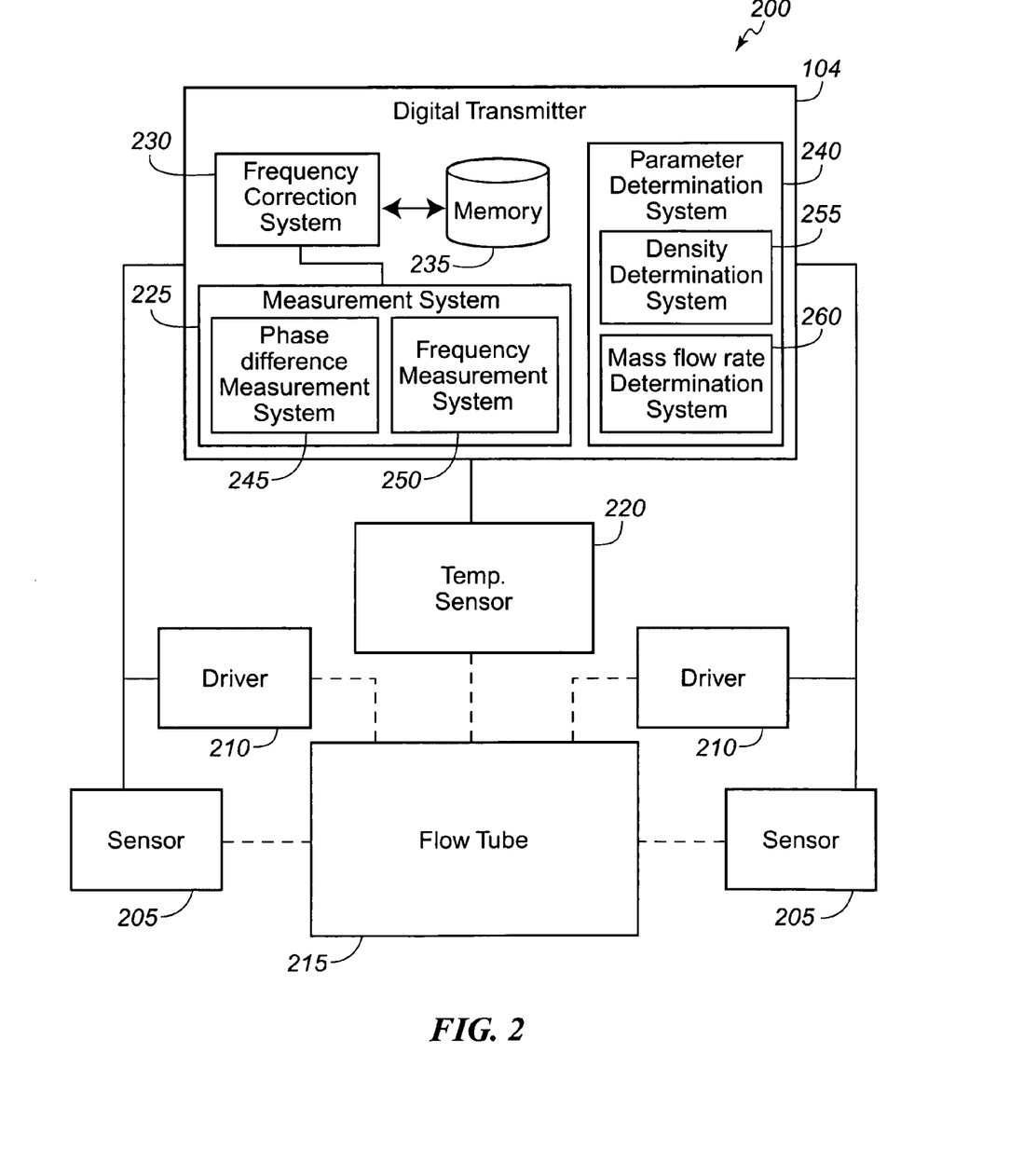
FIG. 2 is a block diagram of a Coriolis flowmeter.

Referring to FIG. 2, a digital mass flowmeter 200 includes the digital transmitter 104, one or more motion sensors 205, one or more drivers 210, a flowtube 215 (which also may be referred to as a conduit, and which may represent either the bent flowtube 102, the straight flowtube 106, or some other type of flowtube), and a temperature sensor 220. The digital transmitter 104 may be implemented using one or more of, for example, a processor, a Digital Signal Processor (DSP), a field-programmable gate array (FPGA), an ASIC, other programmable logic or gate arrays, or programmable logic with a processor core. It should be understood that, as described in U.S. Pat. No. 6,311,136, associated digital-to-analog converters may be included for operation of the drivers 210, while analog-to-digital converters may be used to convert sensor signals from the sensors 205 for use by the digital transmitter 104.

The digital transmitter 104 generates a measurement of, for example, density and/or mass flow of a material flowing through the flowtube 215, based at least on signals received from the motion sensors 205. The digital transmitter 104 also controls the drivers 210 to induce motion in the flowtube 215. This motion is sensed by the motion sensors 205, which may be positioned, for example, on a right and left side of the flowtube 215.

Density measurements of the material flowing through the flowtube are related to, for example, the frequency of the motion of the flowtube 215 that is induced in the flowtube 215 by a driving force supplied by the drivers 210, and/or to the temperature of the flowtube 215. Similarly, mass flow through the flowtube 215 is related to the phase and frequency of the motion of the flowtube 215, as well as to the temperature of the flowtube 215. Other measurement parameters also may affect the density and/or mass flow measurements.

The temperature in the flowtube 215, which is measured using the temperature sensor 220, affects certain properties of the flowtube, such as its stiffness and dimensions. The digital transmitter 104 may compensate for these temperature effects. Also, while external temperature sensors may be used to measure the fluid temperature, such sensors may be used in addition to an internal flowmeter sensor designed to measure a representative temperature for flowtube calibrations. Also, some flowtubes use multiple temperature sensors for the purpose of correcting measurements for an effect of differential temperature between the process fluid and the environment (e.g., a case temperature of a housing of the flowtube).

A measurement system 225 forming part of the transmitter 104 is operable to interact with the sensor(s) 205, the driver(s) 210, and other components such as the temperature sensor 220, so as to impart and detect motions to/of the flowtube 215. A frequency correction system 230 interacts with the measurement system 225 and a memory 235, so as to ensure that an appropriate frequency is determined by the measurement system 225 when a parameter determination system 240 is calculating parameters such as density or mass flow rate.

In one implementation, the measurement system 225 includes a phase difference measurement system 245, as well as a frequency measurement system 250. Based on the two measured parameters of phase difference and frequency, as well as other parameters such as, for example, a temperature detected by the temperature sensor 220, the frequency correction system 230 may adjust the measured frequency to remove any effect of the measured phase difference on the measured frequency. Then, a density determination system 255 and/or a mass flow rate determination system 260 within the parameter determination system 240 may use the corrected frequency value to determine a density and mass flow rate, respectively, of the material flowing in the flowtube 215.

In one implementation, such a corrected frequency value is obtained by the frequency correction system 230 by formulating a characteristic curve of natural frequency vs. phase difference. That is, a model of the natural frequency—phase difference characteristic of, for example, a Coriolis bent flowtube may be obtained. Then, correction based on this model may be used to remove any undesirable dependency between the two variables of frequency and phase difference for that flowtube. This correction of measured frequency, as discussed in more detail below, enables improved accuracy in calculating, for example, density and/or mass flow rate measurements.

Temperature variations also may affect the natural frequency, as these change the properties of the flowtube (e.g. stiffness). Additionally, temperature variations may change the density of the substance itself. Thus, in some implementations, the temperature (as measured by the temperature sensor 220) is optimally kept constant when obtaining the parameters of the model that relates natural frequency with phase difference. In other implementations, for example, with an open flow rig, an approximation of constant temperature may be obtained by minimizing a time window during which data is taken.

Figure 3:
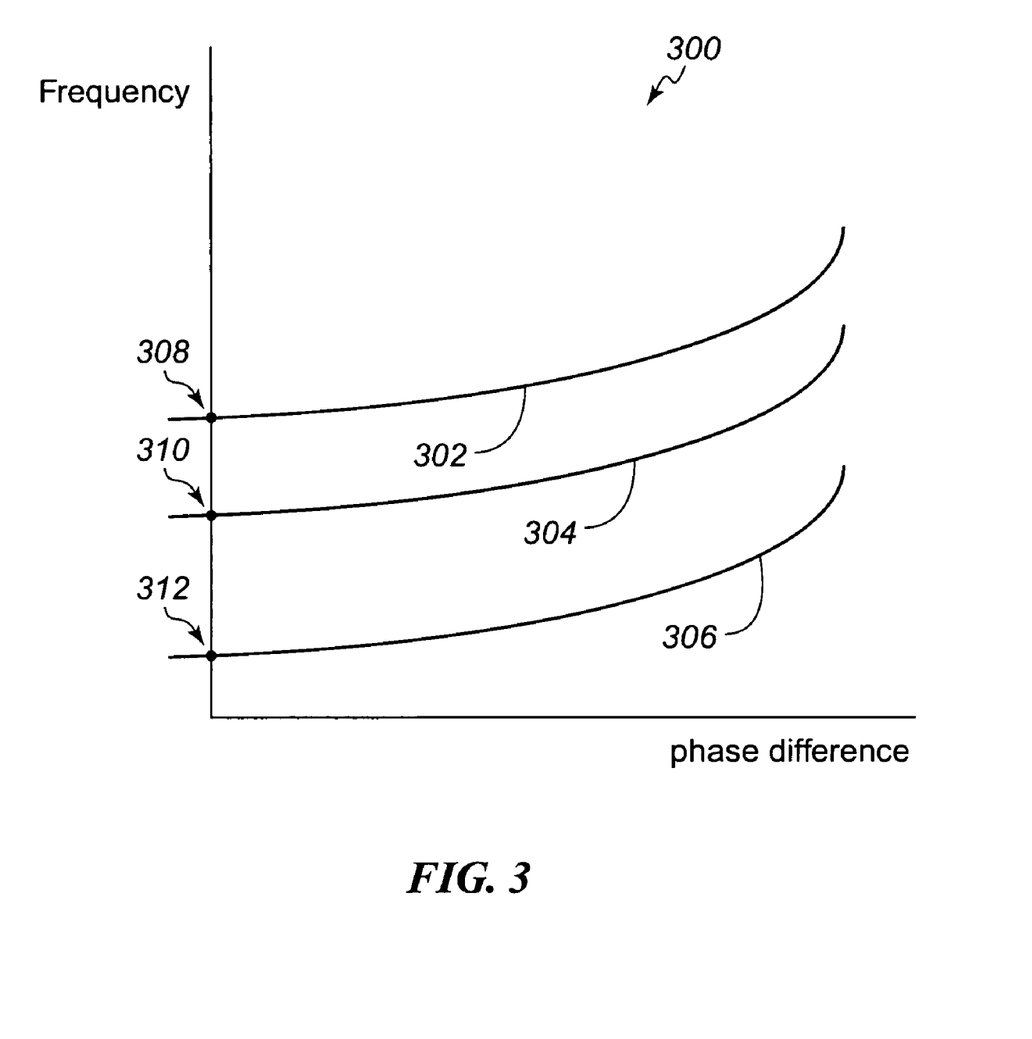
FIG. 3 is a frequency-phase difference diagram for a plurality of substances.

FIG. 3 is a frequency phase difference diagram 300 for a plurality of substances, and shows examples of the characteristic curves referred to above. More particularly, a first data fit line 302 represents a relationship between frequency and phase difference for a first substance, while a second data fit line 304 represents a relationship between frequency and phase difference for a second substance, and a third data fit line 306 represents a relationship between frequency and phase difference for a third substance.

In FIG. 3, the substances associated with curves 302, 304, 306 may be any substance that may be measured using an analog or digital flowmeter. Such substances may include, for example, (liquid) water, steam, oil, syrup or other food products, or various other substances or combinations of substances. Also in FIG. 3, it should be understood that the three data fit lines 302, 304, and 306 are determined for a particular flowtube (e.g., a 1-inch, bent flowtube). That is, details of the shape and values of the data fit lines 302, 304, and 306 may change for different substances in different flowtubes. As a result, in some implementations, the data fit lines are calculated separately for different flowtubes. However, depending on a level of accuracy desired, other implementations may simply use a calculated data fit line across a number of flowtubes and/or substances.

It should be understood that FIG. 3 is a conceptualization of situations in which, as referred to above, there is a substantially direct relationship between a measured phase difference detected at sensors 205 and a corresponding frequency of vibration of the flowtube 215. Such a relationship may generally be observed and/or derived by obtaining measurements of frequency and phase difference in a particular setting (e.g., for a particular substance, flowtube, or temperature), and then performing an appropriate data fit (e.g., linear or quadratic). As such, the diagram 300 is not intended to imply that a frequency-phase difference correlation(s) will necessarily resemble the illustrated curves, but rather, is merely intended to illustrate the general result of obtaining a frequency phase difference relationship.

In FIG. 3, each of the curves 302, 304, 306 have a "zero phase difference" frequency value 308, 310, and 312, respectively, that may be measured and/or calculated by the measurement system 225 and/or the frequency correction system 230. The frequency value(s) thus represent a corrected frequency that may thereafter be used during calculations of, for example, density and/or mass flow of the relevant substance.

In some implementations, the memory 235 is used to store such a corrected frequency value for one or more substances, for example, in a look-up table, where the values may be calculated in multiple settings (e.g., at different temperatures or using different flowtubes). Then, a user of the flowmeter 200 may select an appropriate frequency correction value, based on current measurements to be taken. For example, an output may be provided that lists the various available values/settings, so that the user may choose from the list. In another example, the user may enter current settings, and an output of a corresponding frequency value may automatically be provided for use.

In the following discussion, examples are provided of data taken for calculating a frequency value that is corrected for a measured phase difference in a particular setting. Then, examples are provided of how the corrected frequency values may be used to obtain other flow parameters, such as, for example, density measurements.

Figure 4A:
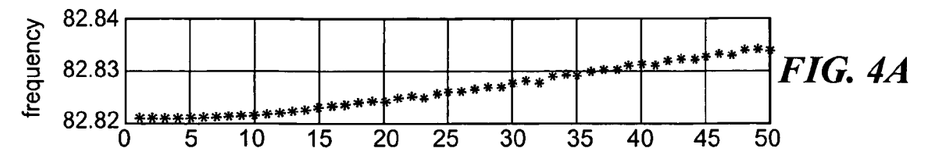
FIGS. 4A–4D are graphs representing data taken from a 1-inch flowtube at various mass flow rates.
Figure 4B:
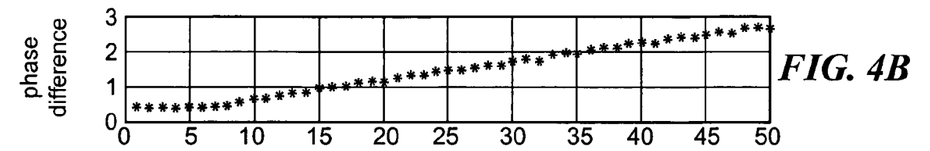
Figure 4C:
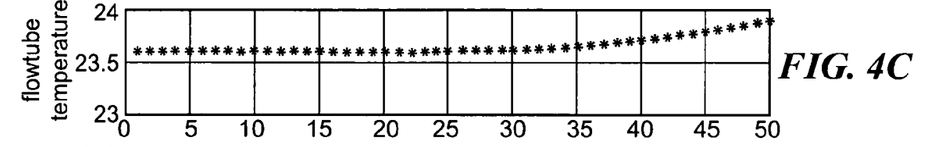

FIGS. 4A–4D are graphs representing data taken from a 1-inch flowtube at various mass flow rates. In FIGS. 4A–4D, a steady pressure in the flowtube 215 was obtained by adjusting a pneumatic valve. Pumps were used to progressively increase flow rate through the flowtube from 30% to 100%, in steps of 5%. In FIGS. 4A–4D, respectively, mean values over 2,500 cycles of (average) frequency, phase difference, flowtube temperature, and density were recorded in the memory 235. After each increase in pump speed, the flowtube vibration was allowed to settle down for a predetermined number of cycles (e.g., at least 5,000 cycles). In FIG. 4C, it may be observed that the temperature rise was relatively small.

Figure 4D:
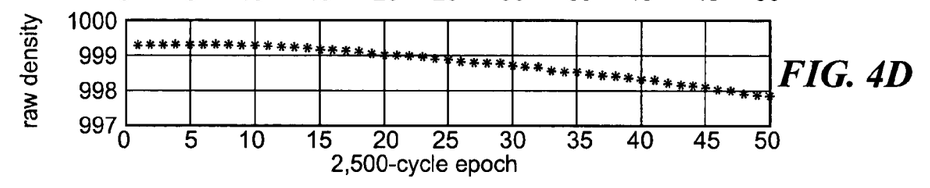

FIG. 4D illustrates a "raw" or apparent density determined by the flowmeter 200. That is, FIG. 4D illustrates a density that is directly determined by the flowmeter 200 without any correction of frequency to account for existing phase differences. As explained above, in one implementation, the density determination system 255 determines a corrected density value based on a corrected frequency value determined by the frequency correction system 230. In another implementation, and as shown here for illustration's sake, a raw density is first determined and is subsequently corrected using values determined by the frequency correction system 230.

Figure 5:
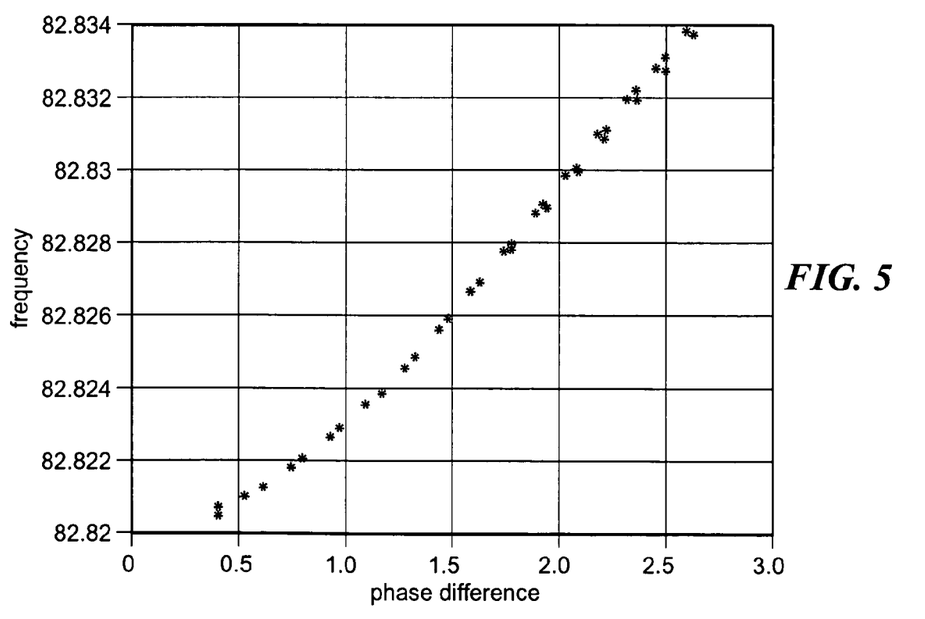
FIG. 5 is a diagram of plot of average frequency versus phase difference for the 1-inch flowtube of FIGS. 4A–4D.

FIG. 5 is a diagram of plot of average frequency versus phase difference for the 1-inch flowtube of FIGS. 4A–4D. It should be understood that FIG. 5 conceptually corresponds to FIG. 3, inasmuch as FIG. 5 illustrates a relationship between a frequency and phase difference for a particular substance in the flowtube in question.

Figure 6:
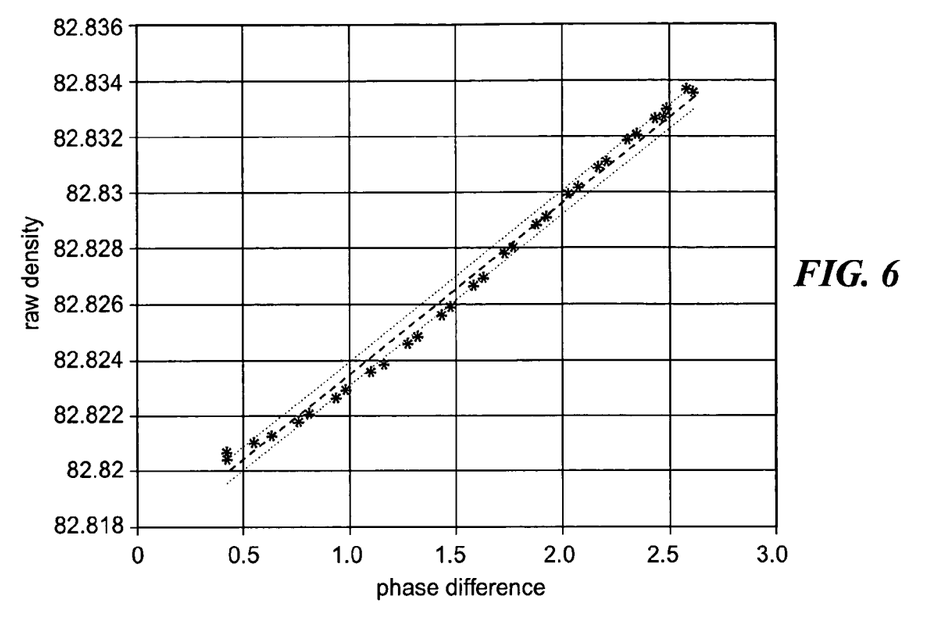
FIG. 6 illustrates a linear regression applied to the diagram of FIG. 5.

FIG. 6 illustrates a linear regression applied to the diagram of FIG. 5. The linear regression resulted in an uncorrected frequency value of [(6.1499e-03 Hz/degrees)(phase difference)+8.2817e+01 Hz]. As a result, the corresponding correction algorithm to obtain the corrected frequency is: [raw (or measured) frequency]−[(6.1499e-03 Hz/degrees)(phase difference)]. The linear approximation and associated 50% error bounds (i.e., if the errors in the data are independent normal with constant variance, the illustrated error bounds contain at least 50% of the predictions) are illustrated in FIG. 6. At zero phase difference, then, the resulting frequency value becomes 82.817 Hz.

Figure 7:
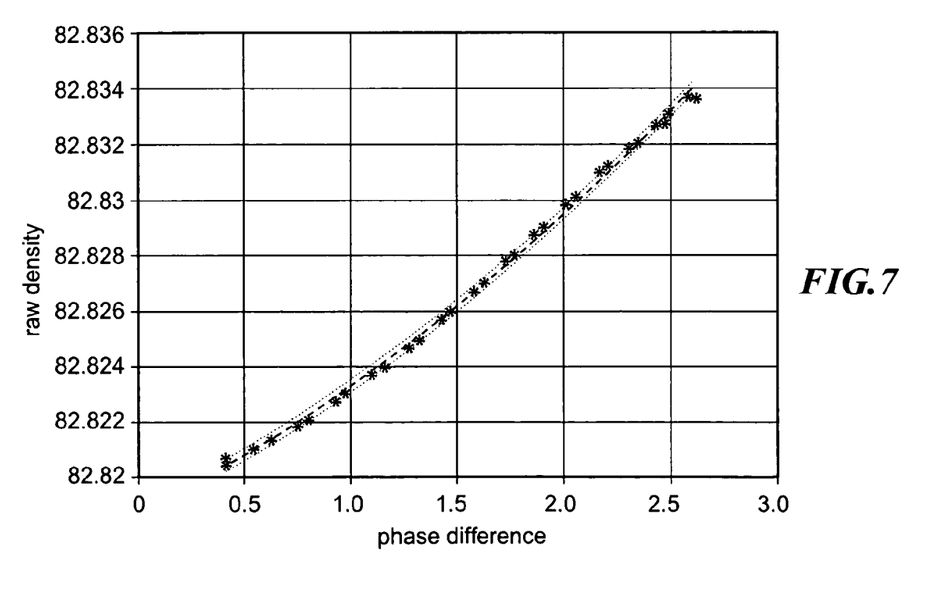
FIG. 7 illustrates a quadratic approximation applied to the diagram of FIG. 5.
Figure 8A:
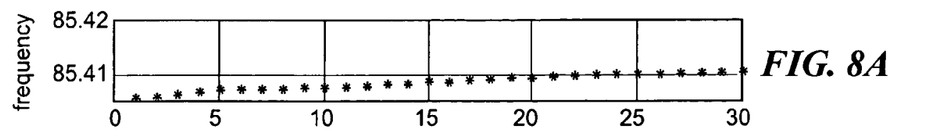
FIGS. 8A–8D reflect similar data as FIGS. 4A–4D, but for a two-inch flowtube.
Figure 8B:
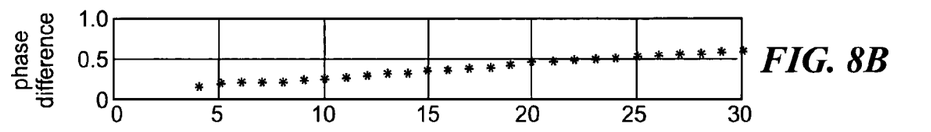
Figure 8C:
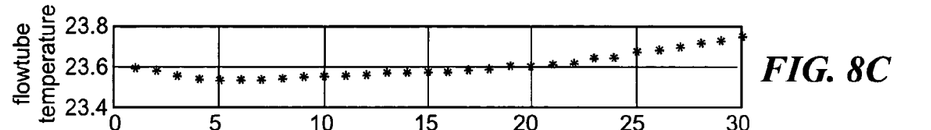
Figure 8D:
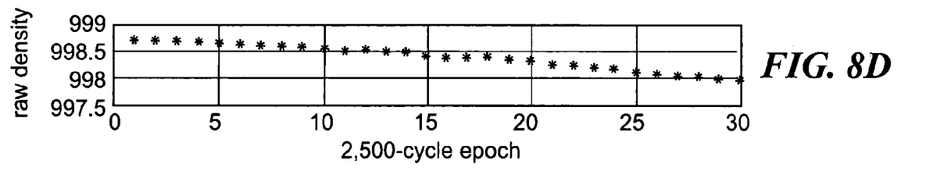

FIG. 7 illustrates a quadratic approximation applied to the diagram of FIG. 5. The quadratic fitting resulted in an uncorrected frequency value of [(8.3274e-04 Hz/degrees$^2$)(phase difference)$^2$+(3.7298e-03 Hz/degrees)(phase difference)+8.2819e+01 Hz], so that the corresponding correction algorithm to obtain the corrected frequency is: [raw (or measured) frequency]−[(8.3274e-04 Hz/degrees 2)(phase difference)2+(3.7298e-03 Hz/degrees)(phase difference)]. In this case, the error was reduced from ±0.8×10$^{-3}$% with the linear regression to ±0.5×10$^{-3}$% with the quadratic fitting, and the zero-phase difference frequency becomes 82.819 Hz.

Figure 9:
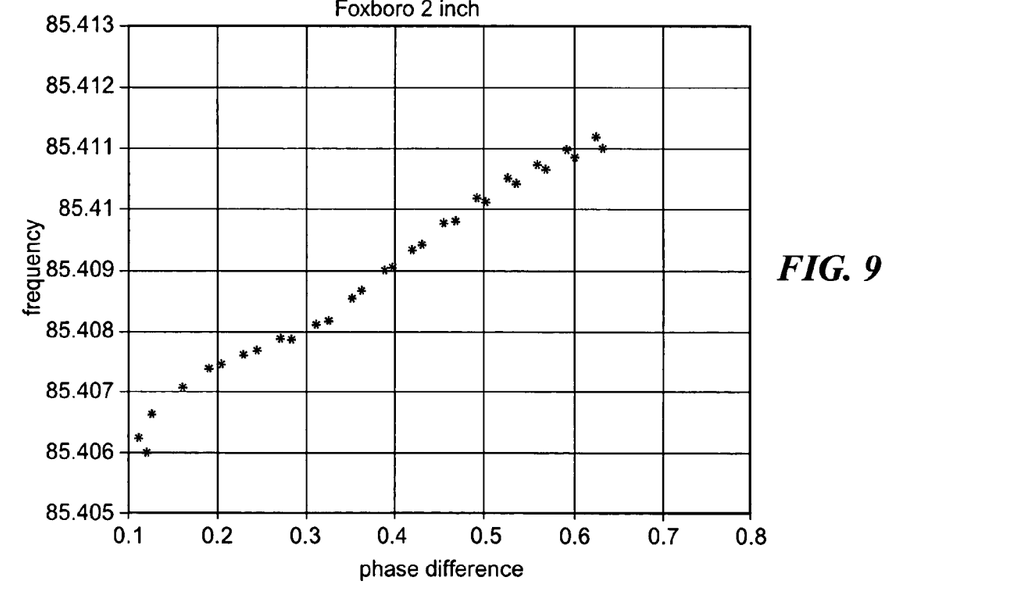
FIG. 9 is a diagram of plot of average frequency versus phase difference for the 2-inch flowtube of FIGS. 8A–8D.

FIGS. 8A–8D reflect similar data as FIGS. 4A–4D, but for a two-inch flowtube. It may be seen that the results are generally comparable to those of FIGS. 4A–4D. The temperature variation for the two-inch flowtube of FIGS. 8A–8D, however, is more noticeable than for the one-inch flowtube of FIGS. 4A–4D. FIG. 9, similar to FIG. 5, is a diagram of plot of average frequency versus phase difference for the 2-inch flowtube of FIGS. 8A–8D.

Figure 10:
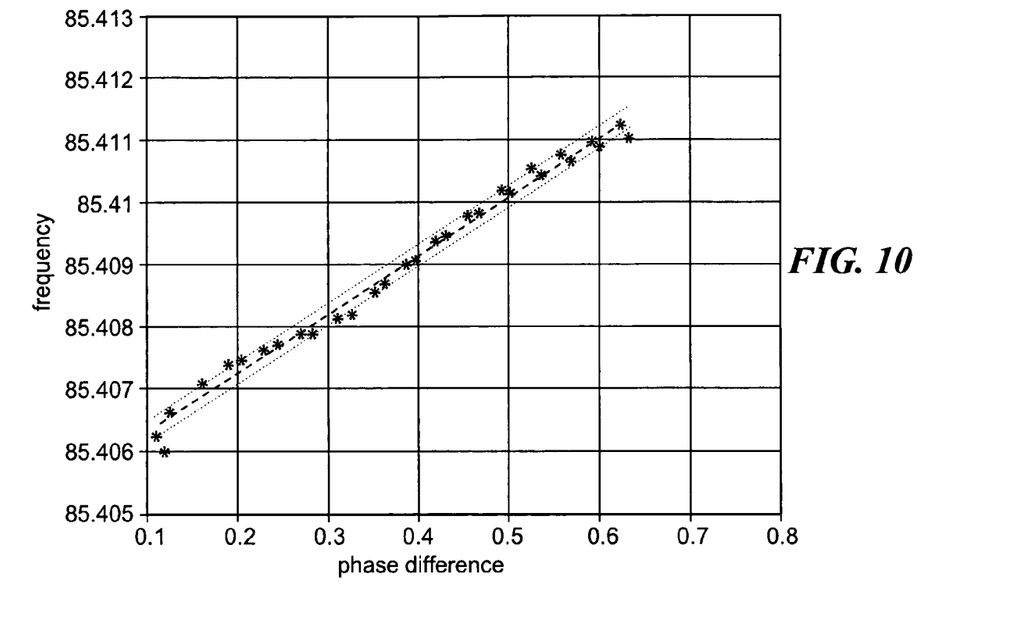
FIG. 10 illustrates a linear regression applied to the diagram of FIG. 9.
Figure 11:
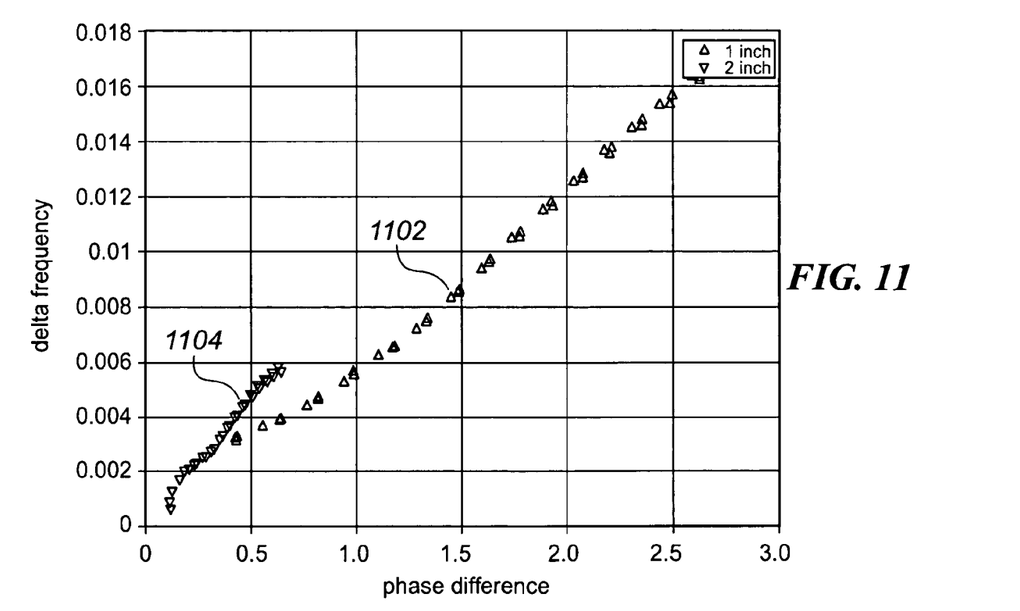
FIG. 11 is a diagram comparing slope coefficients of the linear regressions of FIGS. 6 and 10.

FIG. 10 illustrates a linear regression applied to the diagram of FIG. 9. In FIG. 10, the linear regression resulted in an uncorrected frequency value of [(9.5243e-03 Hz/degrees)(phase difference)+8.5405e+01 Hz], or 85.405 at zero phase difference, so that the corresponding correction algorithm to obtain the corrected frequency is: [raw (or measured) frequency]−[(9.5243e-03 Hz/degrees)(phase difference)]. The linear approximation and associated 50% error bounds are illustrated in FIG. 10, as in FIG. 6. FIG. 11 illustrates the fact that the slope coefficient is different for the two flowtubes, by plotting the two trends together with the offset coefficient subtracted from frequency. In FIG. 11, plot 1102 corresponds to the 1-inch flowtube, while plot 1104 corresponds to the 2-inch flowtube.

Figure 12:
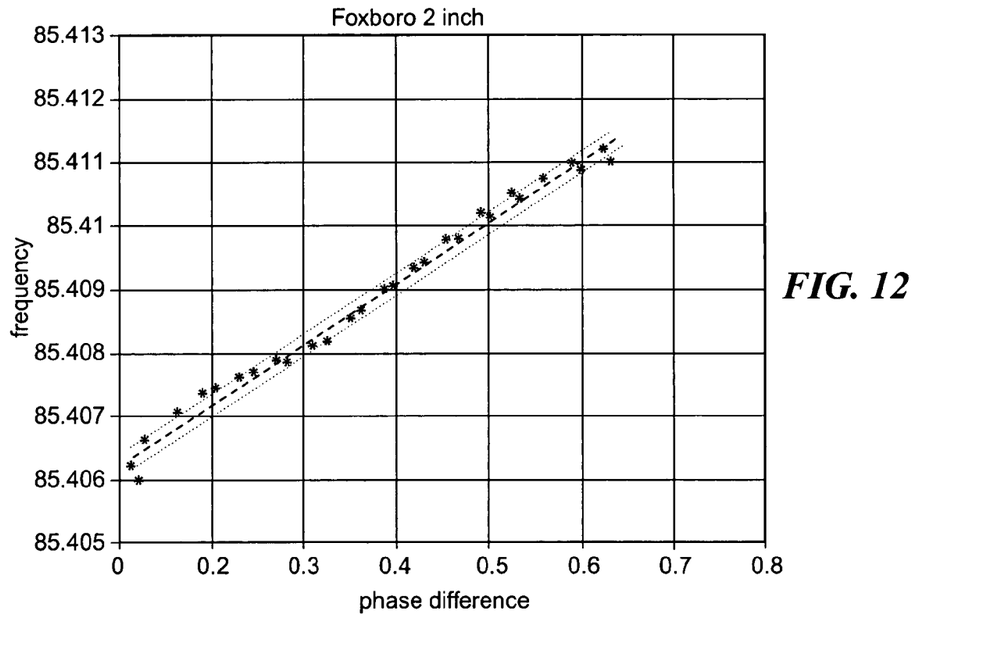
FIG. 12 illustrates a quadratic approximation applied to the diagram of FIG. 9.

FIG. 12 illustrates a quadratic approximation applied to the diagram of FIG. 9. The quadratic fitting resulted in an uncorrected frequency value of [(−1.7751e-03 Hz/degrees$^2$)(phase difference)$^2$+(1.0847e-02 Hz/degrees)(phase difference)+8.5405e+01 Hz], or 85.405 Hz at zero phase difference, so that the corresponding correction algorithm to obtain the corrected frequency is: [raw (or measured) frequency]−[(−1.7751e-03 Hz/degrees 2)(phase difference)2+(1.0847e-02 Hz/degrees)(phase difference)].

Aside from the linear regression and quadratic fitting examples above, it should be understood that many other techniques exist, and may be used, for building a model of dependency between frequency and phase-difference in a variety of settings. For the purposes of providing an example of an application of such a model for frequency correction, results of the quadratic model being used with the 1-inch flowtube (i.e., FIGS. 4A–4D, 5, and 7) is discussed in more detail below.

Figure 13A:
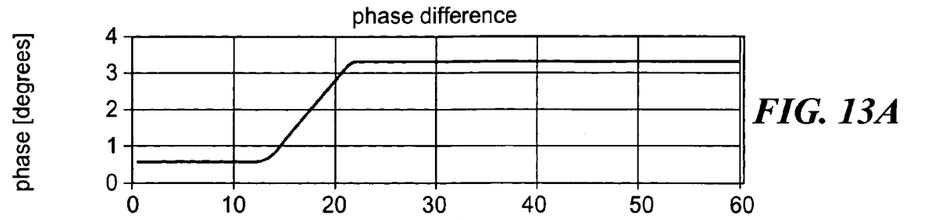
FIG. 13A illustrates phase difference over a given time period.
Figure 13B:
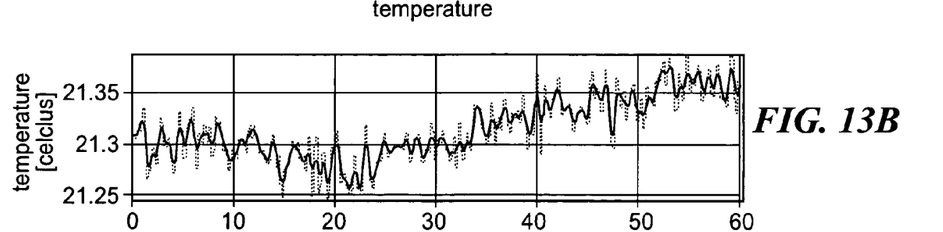
FIG. 13B illustrates temperature over a given time period.
Figure 13C:
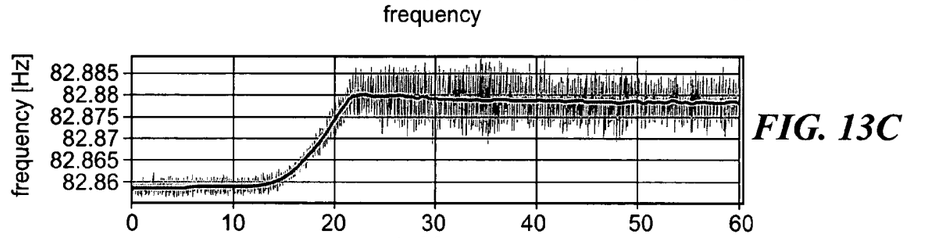
FIG. 13C illustrates measured frequency over a given time period.
Figure 13D:
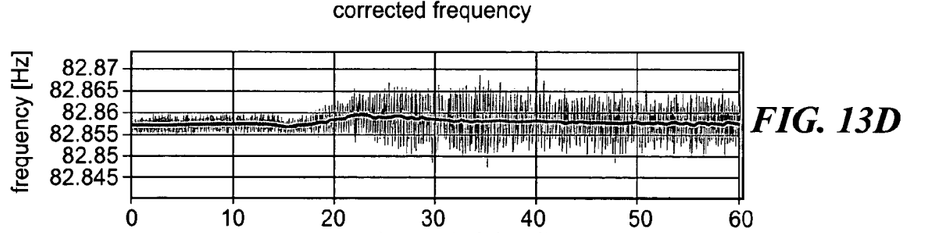
FIG. 13D illustrates corrected frequency over a given time period.
Figure 13E:
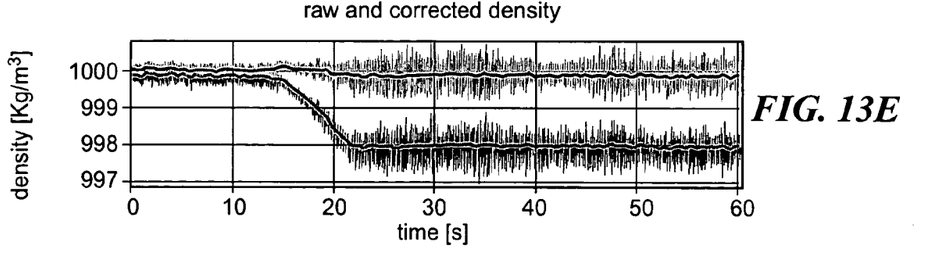
FIG. 13E illustrates measured (raw) density and corrected density over a given time period.

Specifically, the quadratic model was tested on the 1-inch flowtube by applying steps in flow rate. FIG. 13A illustrates phase difference over the relevant time period. FIG. 13B illustrates temperature over the relevant time period. FIG. 13C illustrates measured frequency over the relevant time period. FIG. 13D illustrates corrected frequency over the relevant time period. FIG. 13E illustrates measured (raw) density 1302 and corrected density 1304 over the relevant time period.

In FIGS. 13A–13E, ten-thousand values of raw and corrected frequency (averaged over the two sensors), phase difference, raw and corrected density, and flowtube temperature were collected every half a cycle. A 99-point moving average smoothing filter was applied, and its output plotted in double-thick black line style for each parameter.

In FIGS. 13A–13E, a phase difference step was applied between approximately 12–22 seconds (see FIG. 13A), which resulted in an increase in measured frequency (see FIG. 13C). In FIG. 13C, it may be assumed that the frequency shift at the moment of the step occurs mainly due to the abrupt phase difference shift of FIG. 13A, as temperature variations are much slower (as shown in FIG. 13B).

TABLE 1

| Variable | Absolute Shift | Relative Shift |
| --- | --- | --- |
| phase difference [degrees] | 2.8333 | 629.63% |
| frequency [Hz] | 0.0210 | 0.0254% |
| corrected frequency [Hz] | 0.0020 | 0.0024% |
| density [Kg/m3] | −1.8392 | −0.1840% |
| corrected density [Kg/m3] | −0.0985 | −0.0099% |

Table 1 above lists the values of the average shift with and without the correction in the example of FIGS. 13A–13E. The frequency correction improves the frequency step from FIGS. 13C to 13D by approximately a factor of ten, and the density shift in corrected density 1304 is approximately twenty times smaller than in the raw density 1302.

Figure 14:
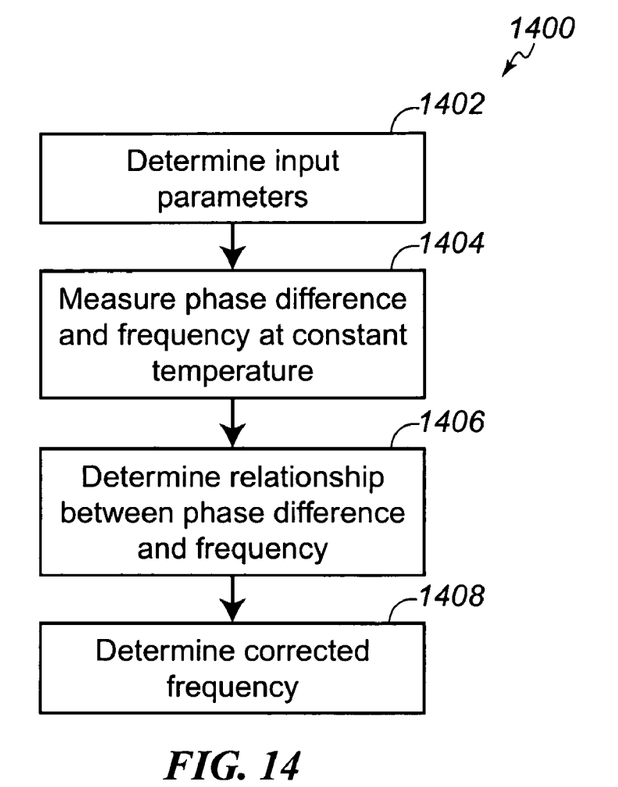
FIG. 14 is a flowchart illustrating techniques for determining a frequency correction.

FIG. 14 is a flowchart 1400 illustrating techniques for determining a frequency correction. In FIG. 14, parameters are selected and input that may affect and/or define the frequency correction (1402). Such parameters may include, for example, a type and size of flowtube being used, as well as a substance to be measured and/or its mass flow rate(s). Other parameters, not explicitly mentioned above, also may be used, such as, for example, an orientation of the flowtube 215 (e.g., vertical or horizontal).

Phase difference and frequency are then measured (and charted) for a substantially constant temperature (1404), using, for example, the phase difference measurement system 245 and the frequency measurement system 250 of FIG. 2. Then, based on the measurements and/or charts, the frequency correction system 230 of FIG. 2 determines a relationship between phase difference and frequency (1406). As already described, numerous techniques exist for defining such a relationship. For example, a linear regression and/or quadratic fit may be used.

Finally in FIG. 14, the frequency correction system 230 determines a corrected frequency (1408). That is, a frequency corresponding to a zero phase difference is determined for future use in calculating, for example, density measurements for the substance and flowtube in question.

Figure 15:
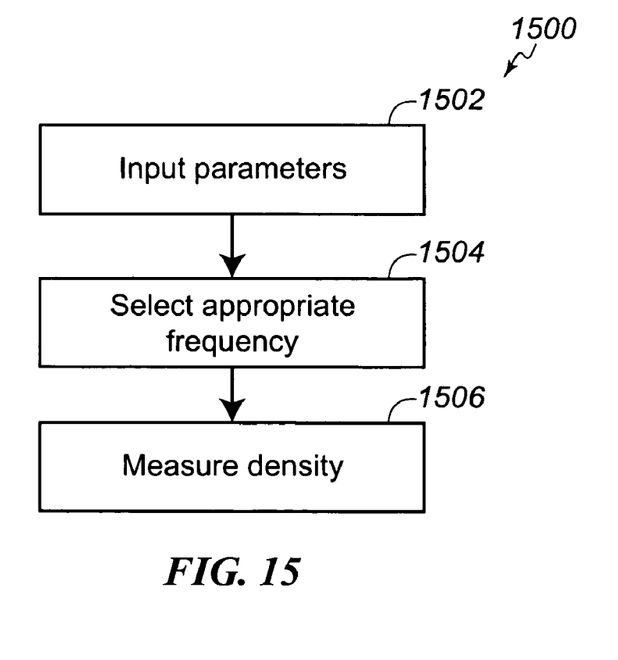
FIG. 15 is a flowchart illustrating techniques for operating a flowtube to obtain accurate measurements.

FIG. 15 is a flowchart 1500 illustrating techniques for operating a flowtube to obtain accurate measurements. In FIG. 15, a user inputs parameters for the measurement about to be taken (1502). For example, the user may input a substance being measured and a type of flowtube being used for the measurement.

Then, a corrected frequency is selected (1504). As referred to above, in one implementation, the frequency correction system 230 refers to the memory 235 for a previously-determined corrected frequency, and automatically outputs or uses this value. In another implementation, the user may presented with a range of corrected frequencies, so that the user may select the applicable one.

Finally in FIG. 15, the density determination system 255 of the transmitter 104 is used to determine a density of a flowing material (1506), using the corrected frequency value as calculated above. For example, the corrected density may be calculated and output directly, or a raw density may be determined, and then corrected using the appropriate frequency value.

As discussed above, various analog and digital flowmeters may benefit from frequency correction with the described model of a dependency between a natural frequency of oscillation and phase difference between at least two sensors detecting the oscillation, which may be useful in reducing an effect of phase difference in frequency to, for example, less than 0.5%.

These techniques may be applicable to a large number of different substances (or combinations of substances), over a wide range of mass flow rates and in a variety of types of flowtubes, including, for example, a bent flowtube or a straight flowtube. Additionally, various (constant) temperatures and/or pressures may be used to collect data for the above or similar models, and an effect of such temperature(s) and/or pressure(s) on frequency may be modeled.

As also discussed above, a digital flowmeter such as the flowmeter 200 may be useful in determining and implementing the frequency correction in a fast, convenient, and integrated fashion. However, analog flowmeters also may be used. For example, an analog flowmeter may output to a separate computer, which may be local or remote, and which may be used to calculate and/or apply the frequency correction, either during or after measurements.

A number of implementations are described above. Nevertheless, it will be understood that various modifications may be made.

What is claimed is:

1. A flowmeter comprising:
a vibratable flowtube;
a driver connected to the flowtube and operable to impart motion to the flowtube;
a first sensor connected to a first portion of the flowtube and operable to sense a frequency of the motion of the flowtube and generate a first sensor signal;
a second sensor connected to a second portion of the flowtube and operable to sense the frequency of the motion of the flowtube and generate a second sensor signal; and
a controller operable to adjust the frequency sensed by the sensors based on a phase difference between the first sensor signal and the second sensor signal, to thereby obtain a corrected frequency;
wherein the controller is operable to determine a relationship between the frequency and the phase difference, based on a plurality of frequency measurements and corresponding phase difference measurements, the relationship being determined using at least one of a linear regression and/or a quadratic fit based on the frequency measurements and phase difference measurements.

2. The flowmeter of claim 1 wherein the controller is operable to determine a density of a material flowing through the flowtube, based on the corrected frequency.

3. The flowmeter of claim 1 wherein the controller is operable to determine a mass flow rate of a material flowing through the flowtube, based on the corrected frequency.

4. The flowmeter of claim 1 wherein the controller is operable to adjust the frequency based on the relationship, and the corrected frequency corresponds to a phase difference of zero.

5. The flowmeter of claim 1 wherein the controller is operable to store the corrected frequency in conjunction with an operational parameter of the flowmeter, the operational parameter including at least one of: a size of the vibratable flowtube, an orientation of the vibratable flowtube, a substance flowing through the vibratable flowtube, a type of the vibratable flowtube, and a temperature of the vibratable flowtube.

6. The flowmeter of claim 5 wherein the controller is operable to output the corrected frequency based on an input of one of the operational parameter.

7. The flowmeter of claim 1 wherein the first sensor is positioned on a first side of the vibratable flowtube, and the second sensor is positioned on a second side of the vibratable flowtube.

8. A method comprising:
determining an operational parameter associated with an operation of a flowmeter;
selecting a corrected frequency corresponding to the operational parameter, the corrected frequency determined based on a phase difference between a first sensor signal and a second sensor signal, and determined based on a relationship between a plurality of measured frequency values and a plurality of measured phase differences, the relationship being determined by using at least one of a linear regression and/or a quadratic fit based on the plurality of measured frequency values and the plurality of measured phase differences, where the first sensor signal and the second signal correspond to a frequency of vibration of a flowtube associated with the flowmeter; and
determining a flow parameter of a material flowing through the flowtube, based on the corrected frequency.

9. The method of claim 8 wherein determining the flow parameter comprises determining a density of the material.

10. The method of claim 8 wherein determining the flow parameter comprises determining a mass flow rate of the material.

11. The method of claim 8 wherein determining the operational parameter comprises receiving the operational parameter from a user of the flowmeter.

12. The method of claim 8 wherein the operational parameter includes at least one of: a size of the flowtube, an orientation of the flowtube, the material flowing through the flowtube, a type of the flowtube, and a temperature of the flowtube.

13. The method of claim 8 wherein selecting the corrected frequency corresponding to the operational parameter comprises accessing the corrected frequency from a memory in which the corrected frequency is stored in conjunction with the operational parameter.

14. The method of claim 8 wherein the corrected frequency corresponds to a phase difference of zero.

15. A flowmeter controller comprising:
  a measurement system operable to receive a first sensor signal and a second sensor signal and determine a frequency of vibration of a flowtube having a material flowing therethrough, based on the first sensor signal and the second sensor signal;
  a frequency correction system operable to determine a corrected frequency of the flowtube corresponding to a zero phase difference between the first sensor signal and the second sensor signal, the frequency correction system further operable to determine the corrected frequency by establishing a relationship between a plurality of frequency measurements and a plurality of phase difference measurements output by the measurement system, the relationship being determined using at least one of a linear regression and/or a quadratic fit based on the plurality of frequency measurements and the plurality of phase difference measurements; and
  a flow parameter determination system operable to determine a flow parameter characterizing the material, based on the corrected frequency.

16. The flowmeter controller of claim 15 wherein the measurement system is operable to measure a phase difference between the first sensor signal and the second sensor signal.

17. The flowmeter controller of claim 15 wherein the frequency correction system is operable to determine the zero phase difference based on the relationship.

* * * * *